F. C. MILLER.
Seed-Separators.
No. 142,170 Patented August 26, 1873.
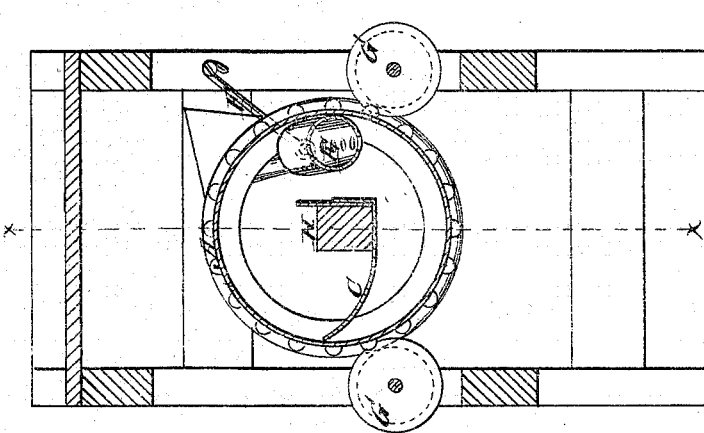
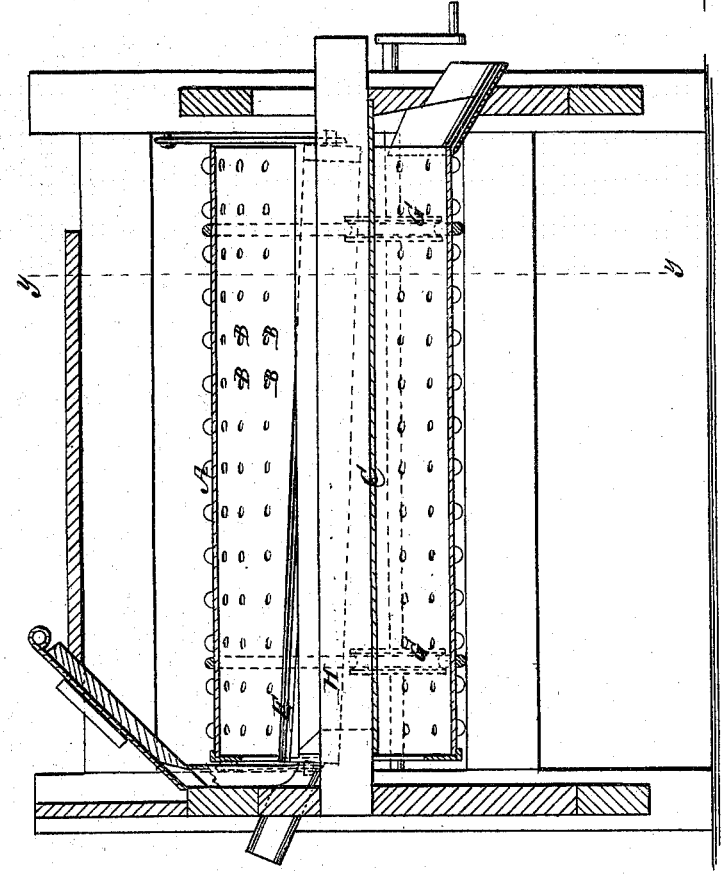
Witnesses:
E. Wolff
Sedgwick
Inventor:
F. C. Miller
Per Munn & Co.
Attorneys.

UNITED STATES PATENT OFFICE.

FRANK C. MILLER, OF BLUE EARTH CITY, MINNESOTA.

IMPROVEMENT IN SEED-SEPARATORS.

Specification forming part of Letters Patent No. 142,170, dated August 26, 1873; application filed May 31, 1873.

*To all whom it may concern:*

Be it known that I, FRANK C. MILLER, of Blue Earth City, in the county of Faribault and State of Minnesota, have invented a new and Improved Grain-Cleaner, of which the following is a specification:

The invention consists in the improvement of grain-cleaners, as hereinafter described and subsequently claimed.

Figure 1 is a longitudinal sectional elevation of my improved cleaner taken on the line $x\ x$ of Fig. 2. Fig. 2 is a cross-section taken on the line $y\ y$ of Fig. 1; and Fig. 3 is a section of a portion of the cylinder and the receptacle for the small matters, enlarged to show the invention more clearly.

Similar letters of reference indicate corresponding parts.

A represents the hollow sheet-metal cylinder, the interior surface of which is studded with numerous small cells, B, too small for the grain, but large enough to admit the cockle and other small matters, to be retained and carried above the grain, and thus separated from it. C represents the stationary trough or receptacle, which extends through the cylinder from end to end, and is arranged with one edge close to the surface of the cylinder near about the center vertically on the upwardly-moving side, so that the matters contained in the small cells will be carried above it and then fall into it. E is a small perforated cylinder, arranged in cylinder A to receive the grain first, and separate the large coarse matters. It is suspended by the rods F, so as to bear against the inner surface of cylinder A and get its motion therefrom by the contact. The cylinder A is supported on the wheels G and turned by them. The receptacle C is supported on the bar H, extending through the cylinder from end to end, and provided with suitable supports. The foul matters accumulating on it may be scraped out at one end from time to time.

The cells of cylinder A may be made by indentations formed in the metal, which will be of some ductile kind for that purpose.

Having thus described my invention, I claim as new and desire to secure by Letters Patent—

The small perforated cylinder E, suspended by rods F and bearing against the inner side of cylinder A, so as to derive its rotary motion therefrom, as shown and described.

FRANK C. MILLER.

Witnesses:
 D. F. GOODRICH,
 E. D. EVANS.